(12) United States Patent  (10) Patent No.: US 7,701,191 B2
Skultety-Betz et al.  (45) Date of Patent: Apr. 20, 2010

(54) METHOD FOR THE DETECTION OF OBJECTS ENCLOSED IN A MEDIUM, AND MEASURING APPARATUS FOR CARRYING OUT SAID METHOD

(75) Inventors: Uwe Skultety-Betz, Leinfelden-echterdingen (DE); Bjoern Haase, Stuttgart (DE); Kai Renz, Leinfelden-echterdingen (DE); Reiner Krapf, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/577,246

(22) PCT Filed: Jan. 3, 2006

(86) PCT No.: PCT/EP2006/050007
§ 371 (c)(1),
(2), (4) Date: Apr. 13, 2007

(87) PCT Pub. No.: WO2006/087246
PCT Pub. Date: Aug. 24, 2006

(65) Prior Publication Data
US 2008/0007245 A1  Jan. 10, 2008

(30) Foreign Application Priority Data
Feb. 21, 2005  (DE)  ........................ 10 2005 007 803

(51) Int. Cl.
*G01R 19/00* (2006.01)
*G01R 33/12* (2006.01)

(52) U.S. Cl. ........................... 324/67; 324/326; 324/228
(58) Field of Classification Search ............. 324/66–67, 324/228, 226, 326, 329, 662, 671–672, 663
See application file for complete search history.

(56) References Cited

U.S. PATENT DOCUMENTS 3,609,522 A  9/1971  Hutchins et al.
5,729,143 A  3/1998  Tavernetti et al.

FOREIGN PATENT DOCUMENTS

| EP | 0 509 408 | 10/1992 |
|---|---|---|
| JP | 05264742 | 10/1993 |
| JP | 2000-111643 | 4/2000 |
| JP | 2003-332934 | 11/2003 |
| JP | 2004-258742 | 9/2004 |

*Primary Examiner*—Reena Aurora
(74) *Attorney, Agent, or Firm*—Michael J. Striker (57) ABSTRACT

The invention relates to a method for detecting objects (12) that are enclosed in a medium (10). According to said method, a test signal (18) that makes it possible to obtain information about the position of the enclosed object (12) is generated via at least one transmission coil (14) and at least one receiving conductor loop system (16) which are inductively coupled to each other. The frequency ($f_M$) of the test signal ($U_M$) is modified in accordance with the signal intensity of the detected test signal (18). The invention further relates to a measuring apparatus, especially a hand-held locating device (24, 124), for carrying out the disclosed method.

11 Claims, 4 Drawing Sheets

METHOD FOR THE DETECTION OF OBJECTS ENCLOSED IN A MEDIUM, AND MEASURING APPARATUS FOR CARRYING OUT SAID METHOD

BACKGROUND OF THE INVENTION

The present invention relates to a method for detecting objects enclosed in a medium.

RELATED ART

Locating devices have been used for a long time to detect objects—such as electrical cables, water lines, pipes, metallic framework or wooden beams—enclosed in a medium, e.g., in a wall, ceiling, or floor. These devices include inductive devices, i.e., devices that produce a magnetic field that is disturbed by the metallic objects enclosed in a medium. In addition to these inductive devices, capacitive devices, mains voltage detectors, and high-frequency detectors are also used.

A problem associated with inductive and capacitive locating devices in particular is the enormous dynamics of the sensors used that exists even though the measuring apparatus has been calibrated; this results in a variation of the signal intensity of the measurement signal that is detected. In order to detect as many metallic objects of different sizes and embedded depth—i.e., the distance of the enclosed object from the measuring apparatus—as possible using metal-locating devices, a large dynamic range must be covered. The large dynamic range of the measurement signal of sensors of this type results from the depth of the objects to be measured in the enclosing medium, and from the characteristic properties of the particular material to be detected. For example, the sensor or measurement signal generated by a copper cable located deep inside a wall is smaller—by several magnitudes—than that produced by an iron pipe located 2 cm inside the wall.

With many of the known locating devices, particularly metal-locating devices, it is therefore possible to manually adjust the sensitivity of the sensor, i.e., for the user to manually adjust the sensitivity of the sensor. Rotary potentiometers, e.g., with an associated rotating wheel installed on the housing of the locating device, are used for this purpose.

With other locating devices, the sensitivity of the sensor and, therefore, the intensity of the detected measurement signal, can be regulated by recalibrating the device for the objects that are present.

With devices of this type, however, it is difficult to detect and/or exactly locate objects of different sizes, e.g., copper cables and steel beams, with one device setting. If the signal intensity of the detected measurement signal is too great, for example, this results in overdrive of the receiving amplifier of a sensor of this type. It is so critical because, in this case, it is no longer possible to detect an increase or decrease in a signal over a wide range, although this must be done in order to locate an enclosed object exactly. In a case such as this, an enclosed object causes maximum deflection of the measuring apparatus over a broad lateral range, so that the user is still uncertain as to the exact position of the object. Nor is it possible, e.g., to detect objects that are located close to each other as two separate objects.

Several proposed designs for detecting signals with large dynamics are known in the related art. It is known to use the following methods, for example:

Use of an AD converter with greater resolution. This results in high component costs, however.

Use of an amplifier with a variable gain factor ("VGA"). These amplifiers are typically sensitive to temperature drift, and they are more expensive than amplifiers with a fixed gain factor.

Use of additional amplification stages and tapping the measurement signal at various amplification stages, depending on the signal amplitude.

These methods all have one thing in common, namely that they require more complex circuitry and additional costs—which can be substantial—in order to be implemented in a metal detector. There are additional disadvantages as well, which are related to the fact that the alternative designs listed above are subjected to greater temperature drift (with VGAs in particular), due to the principle involved. These known solutions have the additional disadvantage of component scattering and, therefore, scattering within a production lot of the metal detector when they are manufactured in large-scale production.

The object of the present invention is to provide a method for detecting objects enclosed in a medium, which ensures that the objects can be located as exactly as possible.

SUMMARY OF THE INVENTION

With the inventive method for detecting objects enclosed in a medium, a measurement signal that makes it possible to obtain information about the position of the enclosed object is generated via at least one transmission coil and at least one receiving conductor loop system which are inductively coupled to each other. This signal is, e.g., a voltage induced in the receiving conductor loop system. Advantageously, the frequency of the measurement signal is modified depending on the signal intensity of the detected measurement signal. The present invention is based on the finding that it is much more cost-favorable to adjust the dynamics on the excitation side than it is to compensate the dynamics on the detector side. The transmission coil used in a method of this type is part of an excitation oscillating circuit that generates a measurement signal and radiates it into a medium to be investigated. An oscillating circuit of this type—which also has capacitance, in addition to the transmission coil—can be optimized in terms of frequency. If the frequency of the measurement signal is now changed, the design of the transmission coil and the associated capacitance are no longer optimized for the measurement signal currently in use. As a result, the signal intensity of the measurement signal that is sent out and that of a detected measurement signal is reduced. This fact is used with the inventive method to influence the signal intensity of the detected measurement signal in a desired manner.

In this manner, it is also possible to adapt the dynamic range of the inventive method to the object to be located at that point in time, and to adjust the signal intensity generated by this object.

Advantageous refinements of the inventive locating method are possible due to the features listed in the dependent claims.

Advantageously, the signal that controls the transmission coil can be obtained directly or indirectly from a digital frequency generator with pulse-width modulation, the on/off ratio of which is modified depending on the signal intensity ($U_M$) of the detected measurement signal.

It is also possible to specify the frequency ($f_M$) of the measurement signal, i.e., the signal that controls the transmission coil, with the aid of a digital signal, particularly a square-wave signal, and to modify the frequency by reconfiguring a digital control unit, particularly a microprocessor. A suitable control program can be used to advantage for this purpose.

With the inventive method, at least one threshold value for the detected measurement signal can be provided, and, when this threshold value is exceeded, the frequency of the measurement signal is modified. When, e.g., with small objects—the detected measurement signals of which are low-intensity—the process is carried out with the greatest possible sensitivity by optimizing the measuring frequency to the oscillating circuit of the excitation coil and/or to the receiving branch, then the process is carried out with less sensitivity when large objects are involved, which would generate a correspondingly greater signal intensity. To this end, the frequency of the measurement signal is modified when a threshold value for the detected signal intensity is exceeded. As a result of the measuring frequency being modified, the oscillating circuit of the transmission coil and the receiving branch are detuned, and the intensity of the measurement signal is reduced simply due to this effect.

The inventive method therefore makes it possible to modify the measuring sensitivity merely by modifying the measuring frequency. As a result, the incoming signal is reduced, and objects that would otherwise result in overdrive of the receiving branch—i.e., that would result in gain saturation of the receiving amplifier, for example—now deliver measurement signals that make it possible to reliably detect a location.

Overdrive, e.g., of the receiving amplifier, with a locating method of this type is so critical because, in this case, no further signal increases or decreases can be detected and, therefore, a measuring apparatus would detect, e.g., maximum signal intensity over a wide range, thereby making it impossible to locate an object exactly.

With the inventive method, the frequency of the measurement signal is advantageously increased when a threshold value for the detected measurement signal is exceeded. Typical values for an increase of this type are in the range of 10 to 100% of the frequency of the measurement signal. In a particularly advantageous embodiment of the inventive method, the frequency of the measurement signal is increased by approximately 40% when a first threshold value for the intensity of the detected measurement signal is exceeded.

In other embodiments, it is also possible, of course, to lower the frequency of the measurement signal when a first threshold value for the intensity of the measurement signal is exceeded.

With the inventive method, it is provided that the frequency of the measurement signal is modified when a second threshold value for the intensity of the detected measurement signal is fallen below. In particular, the frequency of the measurement signal can be reduced back to a value used originally as soon as the signal intensity of the detected measurement signal reaches a second threshold value.

In addition to the first and second threshold values described, further threshold values can also be provided in a similar manner with the inventive method.

It can also be advantageous with the inventive method to increase or reduce the measuring frequency—that has already been modified, i.e., increased or reduced—once more when a threshold value is reached, in order to prevent the signal intensity from becoming too great or weak.

In an advantageous embodiment of the inventive method, the frequency change $\Delta f_M$ of measurement signal frequency is carried out in discrete frequency increments. It can be provided, e.g., to switch the measurement signal back and forth between two, three or several discrete frequencies.

Basically, a frequency change of this type can also take place in a continual manner.

The inventive method makes it possible to realize a measuring apparatus, particularly a hand-held locating device, that makes it possible to detect objects enclosed in a medium across a wide dynamic range with great local accuracy. It can be advantageously provided with a measuring apparatus of this type that the change in measuring sensitivity of the measuring apparatus resulting from the change in measuring frequency is carried out in a manner that is not seen by the user of a measuring apparatus of this type, because it is automatically controlled by the device itself. When the measuring apparatus detects a signal intensity that is above a previously determined threshold value, a control routine of the measuring apparatus can automatically switch to a modified measuring frequency, e.g., a higher measuring frequency.

In alternative embodiments of a measuring apparatus for carrying out the inventive method, switching means can also be provided, however, that make it possible for a user to change the frequency of the measurement signal himself when a threshold value for the detected measurement signal is exceeded, in order to change the measuring sensitivity of the measuring apparatus.

The inventive method makes it possible to locate objects enclosed in a medium with high local accuracy, since the dynamic range of the measurement system can be easily adapted to the intensity of the current measurement signal. This can be easily realized in a measuring apparatus without a great deal of additional circuit outlay. It is possible to modify the dynamic range by modifying the frequency in particular because, at higher frequencies, the magnetic susceptibility of most magnetic materials sinks rapidly. Increasing the working frequency therefore results in a reduction of the measurement signal received.

With non-ferromagnetic objects, however, such as copper, increasing the working frequency does result in a higher quality of detection, since, with these materials, the magnitude of the effect on the coils of the sensor system is smaller anyway, but, in practical application, this results, in very rare cases, in the measurement signal being over-shot, thereby resulting in gain saturation.

Further advantages of the inventive method and a measuring apparatus for carrying out a method of this type are indicated in the description, below, of an exemplary embodiment, and in the associated drawing.

BRIEF DESCRIPTION OF THE DRAWINGS

An exemplary embodiment of the inventive method is depicted in the drawing, and it is described in greater detail in the subsequent description. The figures in the drawing, their descriptions, and the claims contain numerous features in combination. One skilled in the art will also consider the features individually and combine them to form further reasonable combinations.

DETAILED DESCRIPTION OF AN EXEMPLARY EMBODIMENT

Figure 1:
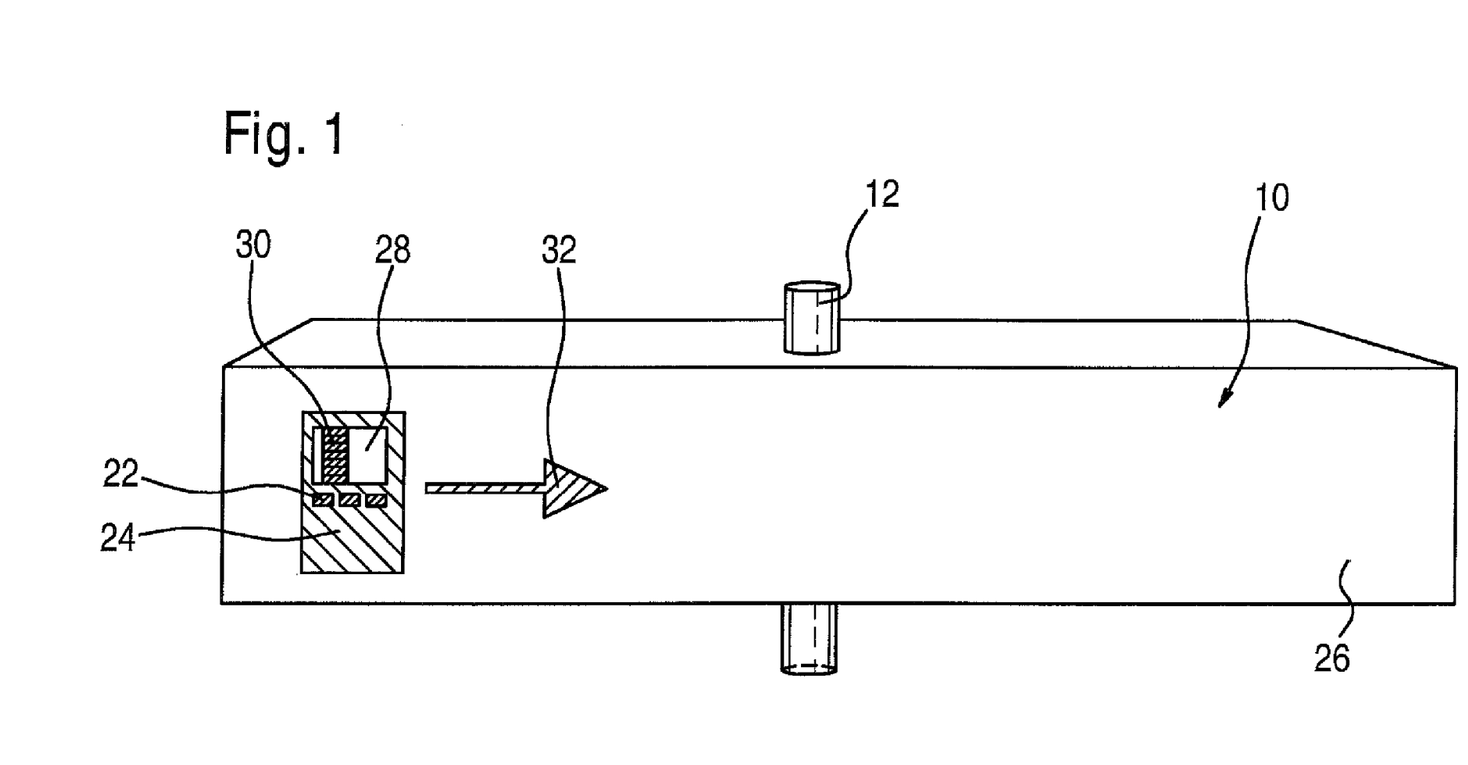
FIG. 1 shows a typical measurement situation for locating an object enclosed in a medium, in a schematicized depiction.

FIG. 1 shows a typical measurement situation for locating objects enclosed in a medium 10, e.g., a wall, a floor, or a ceiling. A locating device 24 is moved along surface 26 of a medium 10 to be investigated in order to detect, i.e., locate, the position of an object 12 enclosed in medium 10. An object 12 of this type can be, e.g., an electrical cable, a pipe, e.g., a water pipe, metallic framework, or other objects. A locating device 24 of this type includes, in particular, an inductive sensor with at least one transmission coil and a receiving conductor loop system that serves as a receiving unit. A locating device 24 of this type includes, in addition to control electronics, the associated energy supply and an evaluation unit for the detected measurement signal, e.g., a graphical display 28 that displays an output quantity that is correlated with the intensity of the detected measurement signal. The output quantity can be depicted, e.g., in the form of a bar diagram 30, with which the number of illuminated bars between a minimum value and a maximum value is a measure of the intensity of the measurement signal. In addition to the depiction of the output quantity using a bar diagram 30 as shown in FIG. 1, other output forms are also possible, particularly further optical depictions.

A locating device 24 of this type includes, e.g., a compensation sensor. A sensor of this type includes, e.g., three coils. A first transmission coil is connected to a first transmitter, a second transmission coil—if present—is connected to a second transmitter, and a receiving conductor loop system that serves as a receiving coil is connected to a receiver. The two transmission coils are supplied with alternating currents of a frequency $f_M$ and opposed phase by their transmitters. The first transmission coil induces a flux in the receiving coil, which is oriented in the opposite direction from the flux induced in the receiving coil by the second transmission coil. The two fluxes induced in the receiving coil therefore compensate each other. As such, the receiver does not detect a received signal in the receiving coil if an external, metallic object is not located near a coil assembly of this type. Flux $\phi$ excited by the individual transmission coils in the receiving coil depends on various quantities, e.g., the number of windings and the geometry of the coils, and on the amplitudes of the currents supplied to the two transmission coils, and on the mutual phase angle of these currents. With detectors of these types, these quantities must ultimately be optimized so that the least amount of flux $\phi$ possible is excited in the receiving coil if a metallic object is not present.

As an alternative, it is possible to use only one transmission coil and to position the receiving winding system three-dimensionally such that no voltage is induced when there are no metallic objects present in the receiving conductor structures.

If a metallic object is now present in the vicinity of a receiving geometry of this type, this object modifies the field generated by the transmission geometry so that a resultant flux is induced in the receiving coil. The flux induced in the receiving coil and/or a receiving conductor loop system can then be tapped as the measurement voltage, e.g., at the coil or downstream measuring amplifiers. The detected measurement signal, e.g., tapped measurement voltage $U_M$, is that much greater the closer the inductive sensor comes to the enclosed object.

When a locating device 24 of this type approaches an enclosed object 12, as would be the case, e.g., by moving it in the direction of arrow 32 shown in FIG. 1, the detected measurement signal increases.

With devices according to the related art in particular, measurement situations can now occur in the vicinity of enclosed object 12, with which the measurement signal is so strong across a greater displacement path of locating device 24 in the region of object 12 to be detected that the maximum deflection of the output quantity, e.g., tapped measurement voltage $U_M$, is displayed across the entire range. In this case it would not be possible to locate enclosed object 12 exactly.

Figure 2A:
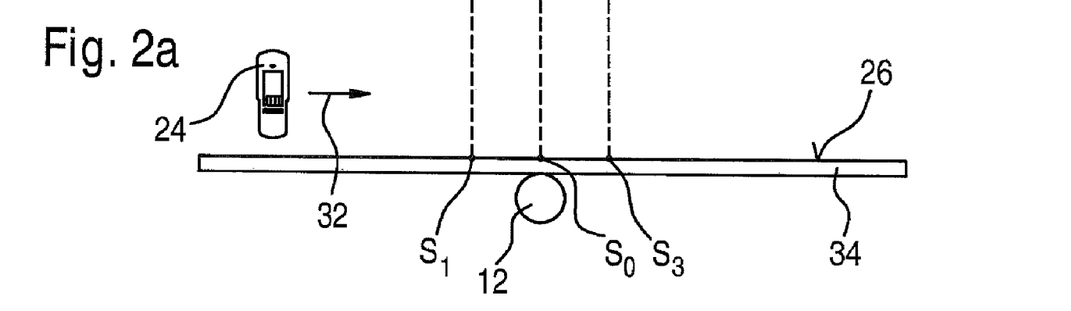
FIG. 2a shows a schematicized depiction of the graph of the detected measurement signal as a function of the location, when the inventive method is used.
Figure 2B:
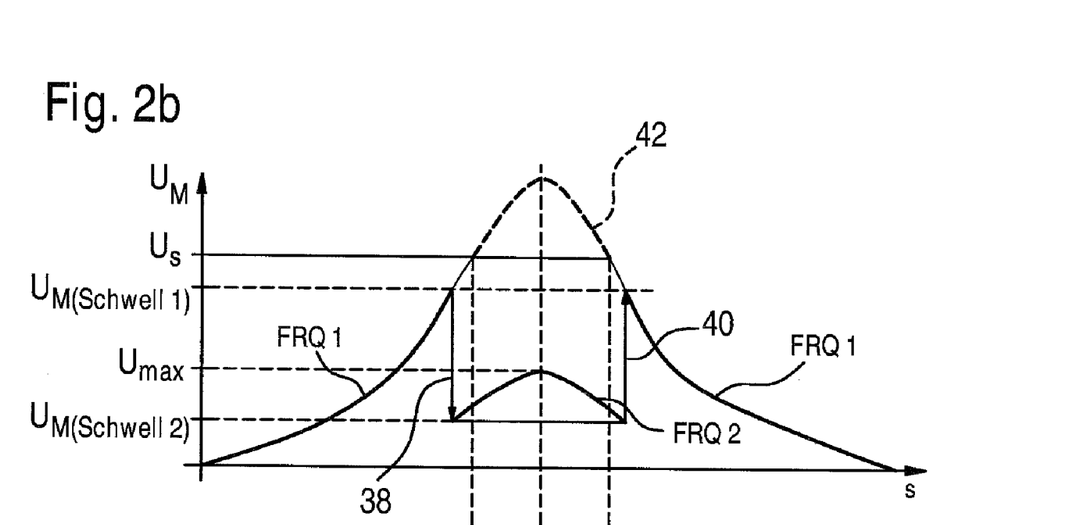
FIG. 2b shows the measurement situation on which the graph of the measurement signal in FIG. 2a is based, in a schematicized depiction.

FIG. 2 is a schematic depiction of the graph of detected measurement signal $U_M$ of a locating device as it approaches or moves away from an enclosed object when this locating device is operated using the inventive method.

The measurement situation is shown again in FIG. 2a. Locating device 24 is moved in the direction of arrow 32 over surface 26, e.g., of a wall 34. An enclosed object 12, e.g., a water pipe, is hidden behind wall 34, at location $S_1$. FIG. 2b shows the graph of detected measurement signal $U_M$ as a function of displacement travel s of locating device 24 over wall 34.

Measurement signal $U_M$ can be, e.g., a measurement voltage that is tapped at the receiving winding system of the sensor.

When the locating device is moved even further away from the enclosed object, as illustrated in the situation in FIG. 2a, the corresponding measurement signal is low. In this measurement situation, the inventive method uses a first frequency $f_{M1}$, to which the oscillating circuits and filter of the locating device have been tuned and for which it has been optimized. This frequency is typically in a range between 1 kHz and 10 kHz, and a frequency of 5 kHz in particular is considered advantageous. When a measurement signal with this frequency $f_{M1}$ is used, the measuring apparatus therefore functions with the greatest possible sensitivity. When the locating device now approaches an enclosed object, i.e., when the locating device is moved in the direction of arrow 32 as shown in FIG. 2a, the measurement signal increases at the same rate as the motion, with frequency $f_{M1}$, as shown in FIG. 2b. If the measurement would be continued, unchanged, with the same measurement frequency $f_{M1}$, then signal saturation in the evaluation electronics of the receiving sensor would occur at a position $S_1$—in the example shown in FIG. 2—which, under certain circumstances, can still be far away from actual position $S_0$ of the enclosed object. For example, an amplifier located downstream from the receiving coil could experience gain saturation. If, with this configuration, locating device 24 would continue to be moved in the direction toward enclosed object 12, measurement signal $U_M$ would stop increasing, due to the gain saturation, and the intensity of the measurement signal would remain constant at a level $U_S$, as indicated in FIG. 2b. In a situation of this type, the locating device can be moved past point $S_0$ of the enclosed object without it being possible to identify this point via a significant change in measurement signal $U_M$. Dashed curve 42 with its maximum at point $S_0$ of the enclosed object shows the shape of the curve that would occur if there were no saturation in the detected signal intensity, as would be the case, for example, if the dynamic range of the measuring amplifier used was not limited.

Due to the finite dynamic range of the gain of the detected measurement signal, the saturation behavior described does occur, however. This is illustrated in FIG. 2b by the range of the constant measurement signal between points $S_1$ and $S_3$. When locating device 24 is once more far enough away—in the direction of arrow 32—from enclosed object 12, i.e., when it has reached position $S_3$ shown in FIG. 2, and has passed it, then detected measurement signal $U_M$ is once again so faint that it no longer results in gain saturation. A changeable measurement signal $U_M$ is therefore present, which decreases as the distance from position $S_0$ of enclosed object 12 increases, as shown in FIG. 2b.

Over a finite range between points $S_1$ and $S_3$, which can amount to several decimeters, depending on the nature of enclosed object 12, a constant signal level $U_S$ would be measured with a conventional locating device, which would hinder the exact identification of location $S_1$ of enclosed object 12.

With the inventive method, measurement signal $U_M$ is switched from frequency $f_{M1}$ to frequency $f_{M2}$ when a first threshold value $U_{M\ (Schwell\ 1)}$ is reached. Threshold value $U_{M\ (Schwell\ 1)}$ is below signal intensity $U_S$, which would result in gain saturation. In this manner, it can be prevented that, e.g., the measuring amplifier of the locating device used will be overdriven.

Since the excitation and transmission side, and the receiving side have been optimized for frequency $f_{M1}$, a detuning of frequency $f_{M1}$ by an amount $\Delta f$ to frequency $f_{M2}$ ($f_{M2}=f_{M1}+\Delta f$) results in a reduction of the intensity of the detected measurement signal $U_M$. When the measurement frequency is switched over, the detected signal intensity therefore decreases, as indicated by arrow 38 in FIG. 2b. Frequency change $\Delta f$ is selected such that the voltage level generated by measurement signal $U_M$ at frequency $f_{M2}$ is lower and, in particular, is clearly below saturation limit $U_S$ of the amplifier system. To this end, the working frequency can be increased by 40-50%.

When a locating device that employs the inventive method is moved past point $S_1$ and closer to enclosed object 12, this is represented by a graph of measurement signal $U_M$, as shown with measurement curve FRQ2 in FIG. 2b. The measurement signal continues to rise, starting at position $S_1$ as it approaches position $S_0$ of the enclosed object, reaches a maximum at position $S_0$, and drops off when the locating device is moved in the direction toward point $S_3$. In this manner it is possible to identify position $S_0$ of an enclosed object 12 via a maximum $U_{max}$ of detected measurement signal $U_M$.

When a locating device that employs the inventive method is moved past position $S_0$ of an enclosed object 12 in the direction of arrow 32 in FIG. 2a, the measurement frequency is switched from $f_{M2}$ back to original measurement frequency $f_{M1}$ when a second threshold value $U_{M\ (Schwell\ 2)}$ for measurement signal $U_M$ being detected is fallen below. Since the excitation and transmission sides, and the receiving side have been optimized for frequency $f_{M1}$, this also results in a signal increase, as indicated with arrow 40 in FIG. 2b. When locating device 23 moves in arrow direction 32, starting at position $S_3$, further away from enclosed object 12, the signal intensity drops off continually, as shown in FIG. 2b.

With the inventive method, therefore, the sensitivity of the test system is lowered by detuning the frequency of the measurement signal in the region around an enclosed object to be located, e.g., to avoid gain saturation. Typical values for a detuning $\Delta f$ of this type in the frequency of the measurement signal can be in the range of 10 to 100%. A preferred value for the detuning of the frequency of the measurement signal is approximately 40-50%. The change $\Delta f$ in the measurement signal can be positive or negative. In preferred embodiments, an increase in the measurement frequency ($f_{M2}>f_{M1}$) is used, however. Since the magnetic susceptibility of most magnetic materials sinks rapidly at higher frequencies, increasing the working frequency can result in a lowering of the measurement signal received. With non-ferromagnetic objects, such as copper, increasing the working frequency does result in a higher quality of detection, since, with these materials, the magnitude of the effect on the coils of the sensor system is smaller anyway, but, in practical application, this results, in very rare cases, in the measurement signal being over-shot, thereby also resulting in a desired gain saturation.

Various methods which are basically known can be used to change the frequency of the measurement signal. It is possible, e.g., to switch between two separate frequencies, or to continually detune the working frequency. In the sense of the present invention, "measurement frequency" means not only an individual, discrete frequency, it also refers, e.g., to the intensity maximum of a frequency band with limited width. For example, the working frequency can also be modified continually or discretely using a frequency filter that is displaced across the bandwidth of a frequency spectrum with a limited width. An oscillating circuit located in the excitation and/or transmission part and assigned to the excitation coil, or the receiving branch, can be detuned via frequency modification by using a filter, e.g., an active filter. The received signal is therefore reduced in the method described, so that objects—with which the intensity of the measurement signal of which would otherwise result, e.g., in gain saturation with the disadvantages described—can be located exactly via the local maximum of the detected measurement signal.

When, at frequency $f_{M2}$ that has already been modified, an enclosed object generates a signal level that is so high that detected measurement signal $U_M$ again approaches critical limit $U_S$ of saturation, it is possible to switch to a further frequency that is even higher, for example, when a threshold value is reached, e.g., threshold value $U_{M\ (Schwell\ 1)}$ once more. The number of frequencies used for the detected measurement signal and their size relative to each other are not limited, in principle, and can be optimized depending on the measurement task.

Figure 3:
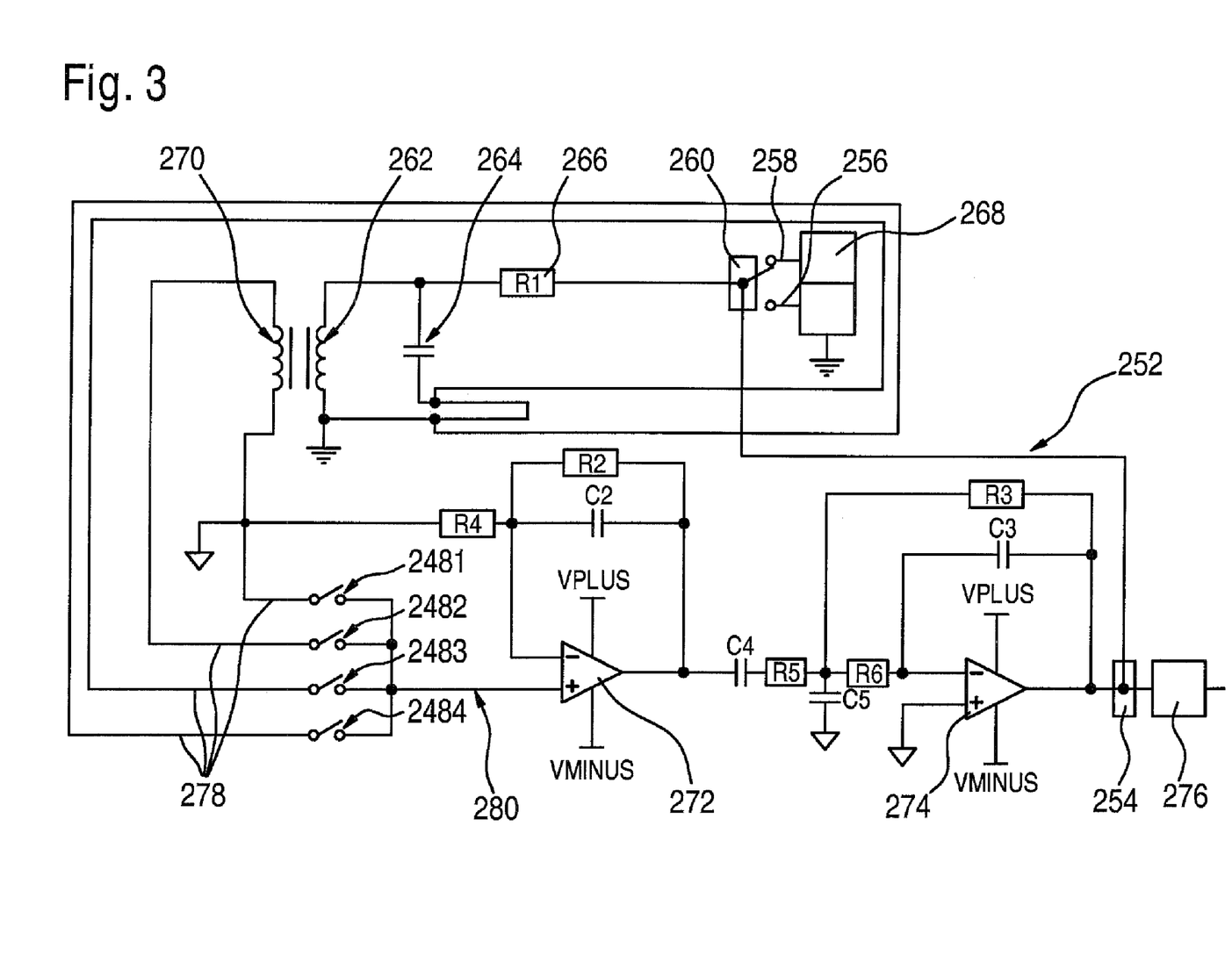
FIG. 3 shows a detailed view of the electrical circuit for generating and evaluating measurement signals using the inventive method.

FIG. 3 shows a detained depiction of an inventive circuit for generating, evaluating and preparing signal voltages, which are induced, in sum, in the individual receiving windings of the inventive sensor.

Inductivity 262 in FIG. 3 refers, e.g., to the excitation coil—which is typically composed of wound wire—of a sensor for a locating device that operates according to the inventive method. Inductivity 262, which, along with capacitance 264, forms an oscillating circuit, is connected via a resistor 266 via switching means 260 with a voltage source 268, which makes it possible, e.g., by using a square-wave generator, to generate a measurement voltage having a different frequency $f_M$.

In FIG. 3, these switching means 260 are depicted as a discrete switch between two settings 256, 258, each of which symbolizes a measurement voltage having a different frequency. These switching means can also be, e.g., an active or passive filter element that isolates the corresponding working frequency out of a broader frequency spectrum. The term "switching means" is not limited to a switch or a discrete switch between individual frequencies.

It is practical to use a square-wave generator, for example, to generate the excitation signal. Using an excitation oscillating circuit, the higher frequencies can be effectively filtered out of the frequency spectrum of this square-wave generator. As a result, only the amplitude of the square-wave generator remains with the fundamental frequency for the signal amplitude generated. Microcontrollers, for example, provide complete hardware blocks, called timers, for a square-wave generator of this type.

The working frequency of these square-wave generators can be changed simply by reprogramming these timer blocks, thereby resulting in no component costs for the product.

Typical timer blocks in microcontrollers also make it possible, as an alternative, to vary the "on/off ratio" of the square-wave output, i.e., to modify the ratio of on-time to off-time. It is possible, e.g., accompanied by a symmetrical square wave (the on-time and off-time are equally long), to transition to a more and more pulse-shaped signal (e.g., brief on-time and long off-time). The period of an on-off cycle can be held constant, i.e., PWM mode (pulse-width modulation). When a pulse-width modulated signal of this type is applied with a constant frequency to a tuned oscillating circuit, it is also possible—with the aid of the on/off ratio—to modify the amplitude of the excitation current in the excitation coil, since shorter pulses—which are also increasing—reduce the Fourier component in the fundamental frequency. This alone is decisive with regard for the current flowing in the coil, however, with an excitation oscillation circuit tuned to the fundamental frequency.

Compared with an amplitude change caused by frequency modification, when the on/off ratio is changed, the fact that the ratio between basic mode and the harmonic waves of the excitation frequency is shifted must be put up with. When the receiver signals are processed further digitially, this can result in problems with under-sampling, due to the relevant Nyquist image frequencies. This problem did not occur in this form when the frequency was varied.

It is also feasible, as an alternative, to realize a frequency switchover using suitable hardware switching means. This is also possible in a cost-favorable manner. When a digitally generated square-wave signal is used, the fact that the frequency change is highly defined, since it is only possible in discrete steps, must also be put up with. It is not subjected to a temperature drift, in particular, and/or the frequency drifts only to the extent that the frequency of the microcontroller clock pulse drifts. This can be held very temperature-stable when a ceramic resonator or quartz is used.

As an alternative to using a digital signal, it is also possible to generate a signal of another form, using a digital-analog converter.

For the current that is effective in the excitation current, a change in the excitation frequency results in the currents flowing in the excitation coil being reduced considerably as soon as there is a deviation from the resonance frequency and, therefore, the amplitude of the measurement signal that can be tapped in the receiving oscillating circuit drops drastically. If the receiving circuit is also realized with a pronounced frequency characteristic (e.g., as a band pass), the amplitude at the amplifier output of the receiver is potentially reduced even further by this frequency characteristic.

Switching means 260 are connected, e.g., via an electrical connecting line 252 with a control means 254, which also adjusts switching means 260 in accordance with a signal level that is detected. The signal level output of a measuring amplifier, for example, can serve as the input signal for control means 254, as depicted symbolically in FIG. 3.

Inductivity 270 in FIG. 3 refers to the receiving conductor loop system, which serves to detect the measurement signal. The detected measurement signal is tapped at this receiving conductor loop system in the form of an induced voltage. In the exemplary embodiment shown in FIG. 3, the evaluation circuit is composed, e.g., of a two-stage amplifier with two operation amplifiers 272 and 274, to the output of which and analog-digital converter (ADC) 276 can be connected, for example. First amplifier level 272, which is designed to be particularly low-noise, amplifies the measurement signal initially, and it is subsequently prepared with band-pass characteristics in a second stage 274. The second amplifier level can ensure, e.g., that higher harmonics of the excitation field can be filtered out of the measurement signal.

A series of switches 2481 through 2484 are located before first amplifier stage 272; they are capable of applying various input signals 278 at input 280 of amplifier level 272. During measurement operation of inventive sensor, e.g., the voltage induced in detector coil 270 can be applied to the input of amplifier level 272 by closing a switch 2482. The further switching elements make it possible to apply reference and control signals, thereby making it possible to calibrate the measurement system.

An evaluation method with digital noise suppression is advantageously realized for the inventive sensor. With filtering of this type, the measurement signal at the output of the measuring amplifier is first digitized synchronously using an analog-digital converter (ADC, 276 in FIG. 3) and is digitially processed further with a downstream digital circuit or a microprocessor. Advantageously, this digital circuit part also generates the driver voltage that controls the excitation and/or transmission coil. It is particularly advantageous to digitize the measurement signal with a multiple frequency (e.g., 10 kHz) of the excitation magnetic field (e.g., 5 kHz). It is then possible to digitize the voltage present at the output of the amplifier stage in the receiving branch with the excitation voltage in a phase-synchronous manner and to thereby attain a digital noise filtering via computation. In this manner, effective noise band widths in the magnitude of a few Hertz can be attained without additional high costs and without a great deal of outlay.

An inventive sensor designed in this manner can be advantageously integrated in a measuring apparatus. A measuring apparatus of this type can be designed, in particular, as a hand-held metal-locating device, or it can include the metal-locating capability according to the inventive method, as an additional function.

Figure 4:
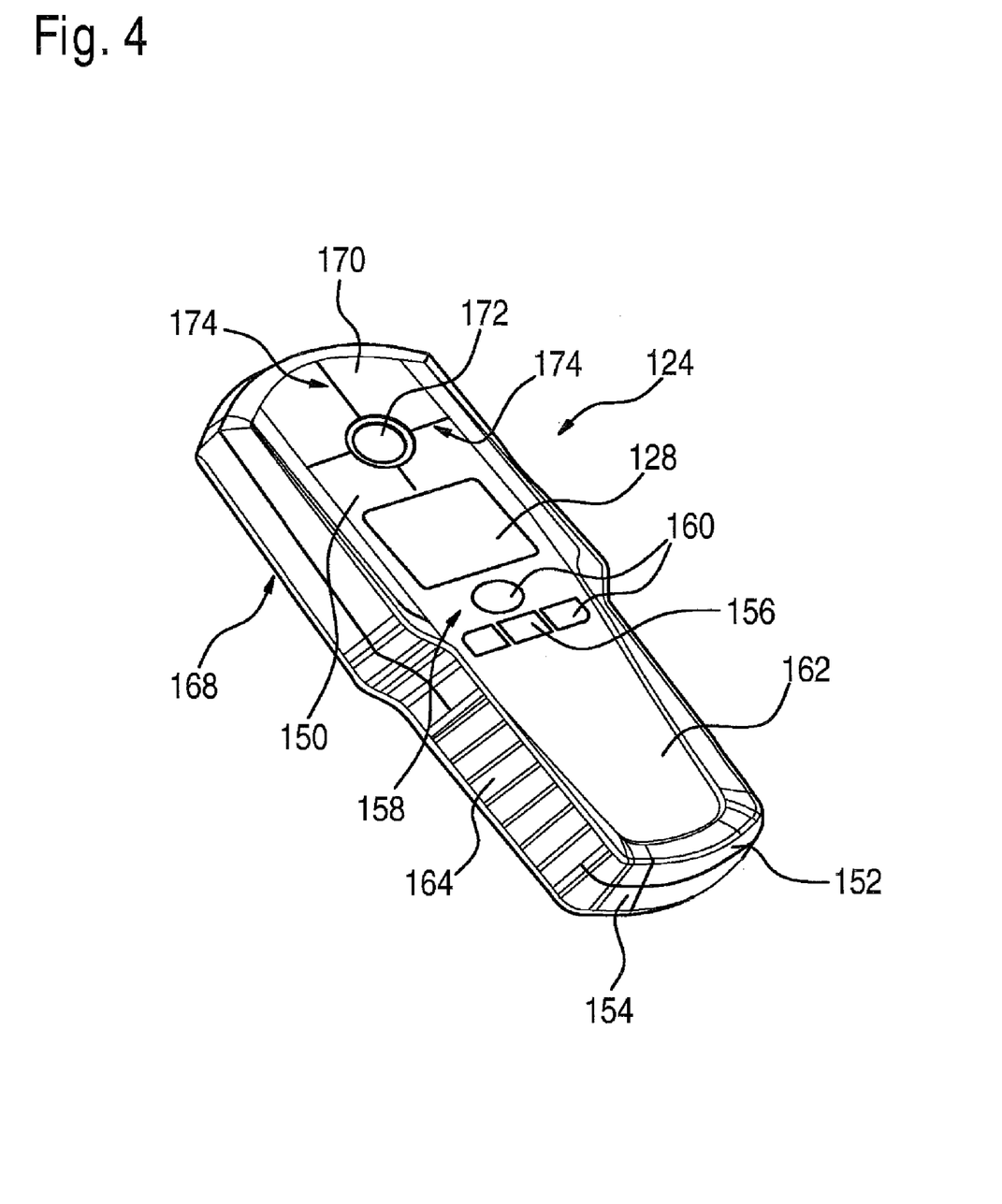
FIG. 4 shows a perspective view of a possible exemplary embodiment of an inventive measuring apparatus.

A possible exemplary embodiment of a measuring apparatus of this type is shown in FIG. 4.

FIG. 4 shows an exemplary embodiment of an inventive measuring apparatus 124 in a perspective overview. The measuring apparatus includes a housing 150, which is composed of a top half shell 152 and a lower half shell 154. At least one sensor with a coil system for metal detection is provided inside the housing. Signal generation and evaluation electronics, and an energy supply, e.g., batteries or rechargeable batteries, are also located inside measuring apparatus 124. The measuring apparatus shown in FIG. 4 also includes a display 128 for outputting an output signal correlated with the measurement signal. Via display 128, e.g., a segmented bar display or a graphical display using an LCD, it is possible to depict the intensity of the detected measurement signal.

The inventive measuring apparatus also includes a control panel 158 with a row of control elements 160 that make it possible to turn the device on or off, or to start a measurement or calibration procedure. Using control element 156, for example, it can be possible for a user to vary the frequency of the measurement signal. It can also be provided that this variation of the measurement frequency is carried out automatically by the device and, in particular, that it is not accessible by the user.

In the region below control panel 158, the measuring apparatus according to FIG. 4 includes a region 162, which is designed—via its shape and material—as handle 164 for guiding the inventive measuring apparatus. Using handle 164, the measuring apparatus is guided via its underside—which is opposite to the observer of FIG. 4—along a surface of an object or a medium to be investigated, such as surface 26 of a wall 10 shown schematically in FIG. 1.

Measuring apparatus 124 has an opening 172 that penetrates the housing on side 170 of measuring apparatus 124 opposite to handle 164. Opening 172 is located concentrically with receiving conductor loop system 134 of the sensor, at the least. In this manner, the location of opening 172 in the measuring apparatus matches the center of the locating sensor, thereby ensuring that the exact position of an object to be detected is also displayed simultaneously to the user of a device of this type. On its top side, the measuring apparatus also includes marking lines 174, via which the user can locate the exact center of opening 172 and, therefore, the position of an enclosed object.

The inventive method can be used not only as a purely inductive measuring apparatus, it can also be used for an additional sensor in measuring apparatus that also use further measurement methods. It is possible, e.g., to use the inventive method and/or a sensor of this type, e.g., as additional diagnostics in a radar detector or in an infrared detector.

It is also possible and advantageous to integrate a sensor according to the inventive method directly or as an add-on part in a machine tool, e.g., in a drilling tool, to enable a user to work confidently with this machine.

The inventive method and a measuring apparatus that operates using this method are not limited to the exemplary embodiment depicted in the Figures.

In particular, the inventive method is not limited to the use of only one transmission coil and/or a receiving conductor loop system. Multifold systems are also possible.

The inventive method makes it possible to automatically adapt the dynamic range of a locating sensor to the object to be located at that instant. Small objects and objects that generate a weak signal intensity are therefore investigated with the maximum possible sensitivity. Large objects and objects with a correspondingly increased signal intensity are automatically measured with low sensitivity. This makes it possible to locate objects exactly, for a broad spectrum of different objects and different embedding depths. This can be carried out automatically, i.e., using control means inside the device. In alternative embodiments, it is also possible, however, to make the switching means accessible to a user so that the frequency of the measurement signal can be changed, by making them actuatable using related control elements in or on the housing of a related locating device, as indicated by control element 22 in FIG. 1.

With the inventive method, the change in measurement sensitivity is brought about by changing the measurement frequency. A great deal of additional circuitry outlay is therefore not required to realize it.

What is claimed is:

1. A method for detecting objects (12) enclosed in a medium (10), comprising the following steps:
generating a measurement signal that makes it possible to obtain information about a position of the enclosed object (12) via at least one transmission coil and at least one receiving conductor loop system which are inductively coupled to each other; detecting the measurement signal at the receiving conductor loop system in the form of induced voltage; and
modifying a frequency ($f_M$) of the measurement signal depending on a signal intensity ($U_M$) of the detected measurement signal (18).

2. The method as recited in claim 1, further comprising obtaining the signal that controls the transmission coil directly or indirectly from a digital frequency generator with pulse-width modulation, the on/off ratio of which is modified depending on the signal intensity ($U_M$) of the detected measurement signal.

3. The method as recited in claim 1, further comprising specifying the frequency ($f_M$) of the measurement signal with the aid of a digital signal, particularly a square-wave signal, and varying the change in frequency by a reconfiguration of a digital control unit, particularly a microprocessor.

4. The method as recited in claim 1, further comprising providing at least one threshold value $U_{M\,(Schwell\,1)}$ for the detected measurement signal $U_M$ (Actual); when it is exceeded, frequency $f_M$ of measurement signal $U_M$(Actual) is modified.

5. The method as recited in claim 4, further comprising providing at least one second threshold value $U_{M\,(schwell\,2)}$ for the detected measurement signal $U_M$ (Actual); when it is fallen below, frequency $f_M$ of measurement signal $U_M$ (Actual) is modified.

6. The method as recited in claim 5, further comprising reducing the frequency ($f_{M2}$) of the measurement signal ($f_{M1}=f_{M2}-\Delta f_M$) when the second threshold value $U_{M(Schwell\,2)}$ is fallen below.

7. The method as recited in claim 4, wherein the frequency change $\Delta f_M$ of frequency $f_M$ of measurement signal $U_M$ (Actual) takes place in discrete increments.

8. The method as recited in claim 4, further comprising increasing the frequency ($f_{M1}$) of the measurement signal ($f_{M2}=f_{M1}+\Delta f_M$) when the first threshold value $U_{M\,(Schwell\,1)}$ is exceeded.

9. A measuring apparatus, particularly a hand-held locating device (24, 124), for carrying out a method for detecting objects (12) enclosed in a medium (10), the method comprising the steps of:
generating a measurement signal that makes it possible to obtain information about a position of the enclosed object (12) via at least one transmission coil and at least one receiving conductor loop system (46) which are inductively coupled to each other; detecting the measurement signal at the receiving conductor loop system in the form of induced voltage; and
modifying a frequency ($f_M$) of the measurement signal depending on a signal intensity ($U_M$) of the detected measurement signal, wherein the measuring apparatus (24, 124) includes switching means (260) that make it possible to change the frequency $f_M$ of the measurement signal $U_M$ (Actual).

10. The measuring apparatus as recited in claim 9 wherein the measuring apparatus (24, 124) includes control means (254) that modify the frequency $f_M$ of the measurement signal $U_M$ (Actual) when the signal intensity of the measurement signal exceeds or falls below a threshold value ($U_{M\,(Schwell\,1)}$, $U_{M\,(Schwell\,2)}$).

11. The measuring apparatus as recited in claim 9, wherein at least one operating element (156) is provided that makes it possible for a user to modify the frequency $f_M$ of the measurement signal $U_M$.

* * * * *